United States Patent [19]

Field et al.

[11] 3,919,690

[45] Nov. 11, 1975

[54] DIGITAL RECEIVING APPARATUS

[75] Inventors: Robert G. Field, Millis; Donn A. Wahl, Dedham, both of Mass.

[73] Assignee: GTE Sylvania Incorporated, Stamford, Conn.

[22] Filed: Feb. 27, 1975

[21] Appl. No.: 553,466

[52] U.S. Cl. .......... 340/146.1 BA

[51] Int. Cl.² .......... G06F 11/00; G08C 25/00

[58] Field of Search .......... 340/146.1 BA, 172.5; 178/23 A; 179/15 AE

[56] References Cited

UNITED STATES PATENTS

| | | | |
|---|---|---|---|
| 3,252,139 | 5/1966 | Moore | 340/146.1 BA |
| 3,737,577 | 6/1973 | Birkin | 178/23 A |
| 3,760,371 | 9/1973 | Pitroda et al. | 340/172.5 |
| 3,772,649 | 11/1973 | Haselwood et al. | 340/146.1 BA |
| 3,842,399 | 10/1974 | Kneuer et al. | 340/146.1 BA |
| 3,863,215 | 1/1975 | McGrogan, Jr. | 340/146.1 BA |

*Primary Examiner*—Charles E. Atkinson
*Attorney, Agent, or Firm*—David M. Keay; Elmer J. Nealon; Norman J. O'Malley

[57] ABSTRACT

A digital receiver for receiving 8-bit permutable address code words. Before receiving each address code word the receiver must be activated by receiving five consecutive identical words of an interdigit signal of alternating 1's and 0's. The receiver must then receive the same address code word five times in succession in order to accept it. The incoming signals are applied to an 8-bit input shift register. Each bit is counted by a counter, but if the incoming bit and the bit in the eighth stage of the shift register are different, the counter is cleared. When the count in the counter indicates five identical 8-bit words have been received in succession and an interdigit detector detects that the word is an interdigit word, a state flip-flop is set. If the state flip-flop was previously in the reset condition, the interdigit word is loaded into an output shift register for reading out on an output line. The next time the counter reaches a count indicating that five identical 8-bit words have been received in succession, if the interdigit detector indicates that the word in the input shift register is not an interdigit word, the state flip-flop is reset and the contents of the input shift register are loaded into the output shift register. The receiver accepts an address code word and loads it into the output shift register only if it is received five times in succession after a sequence of five interdigit words have set the state flip-flop. In addition, the receiver accepts an interdigit code word and loads it into the output shift register only if it is received five times in succession after a sequence of five address code words have reset the state flip-flop.

6 Claims, 2 Drawing Figures

DIGITAL RECEIVING APPARATUS

BACKGROUND OF THE INVENTION

This invention relates to apparatus for receiving digital signals. More particularly, it is concerned with a digital receiver which is activated by a preparatory digital signal prior to receiving the digital information.

In a digital telephone communication system of a certain type during the placing of a call a receiver is assigned to the calling subset and a dial signal is applied to the subset. The subset then produces a digital signal which is designated an interdigit signal. Address code signals are transmitted to the receiver by the subset as by the operation of a keyset. The interdigit signal is interrupted by an address code signal but occurs whenever an address code signal is not being transmitted.

In order to insure accuracy of the address code signals received and accepted by the assigned receiver it is desired that the receiver be activated to receive each address code signal only after confirming that the preparatory interdigit signal has been received several times in succession. After activation by the receipt of several consecutive words of the interdigit signal the receiver must receive an identical address code word several times in succession before the address code word is accepted as valid.

A digital receiver which operates in the foregoing manner is described and claimed in application S.N. (D-7801) entitled "Digital Receiver" filed concurrently herewith by Robert G. Field and Donn A. Wahl. With the receiver described in the foregoing application the address code word is transmitted on an output line from the receiver but the interdigit signal serves only to activate the apparatus and is not transmitted on the output line. In some circumstances it is desirable that when an interdigit signal activates the receiver it is transmitted on the output line.

SUMMARY OF THE INVENTION

Digital receiving apparatus for receiving a predetermined number of particular digital code words, for example interdigit code words, reading out the digital code word then receiving a predetermined number of identical digital words, for example address code words, and reading out the digital word is provided in accordance with the present invention. The digital receiving apparatus includes an input storage means for receiving and storing digital words. A detection means detects the presence or absence of particular digital code words (the interdigit code words) in the input storage means. A counting means determines when the input storage means has received a predetermined number of identical digital words in succession.

The apparatus also includes a control means which is coupled to the detection means and to the counting means. The control means operates in a first of two operating states in response to a determination that the predetermined number of identical particular digital code words (the interdigit code words) have been received by the input storage means. The control means operates in the second of two operating states in response to a determination that the predetermined number of identical digital words other than the particular digital code words (address code words) have been received by the input storage means. The control means produces an indication in response to a determination that the predetermined number of identical particular digital code words (the interdigit code words) have been received by the input storage means when the control means is in the second operating state. The control means also produces an indication in response to a determination that the predetermined number of identical digital words other than the particular digital code words (address code words) have been received by the input storage means when the control means is in the first operating state.

An output storage means is coupled to the input storage means and to the control means. The output storage means receives and stores a digital word stored in the input storage means in response to an indication from the control means. A readout means applies a readout signal to the output storage means to read out the digital word stored in the output storage means.

BRIEF DESCRIPTION OF THE DRAWINGS

Additional objects, features, and advantages of digital receiving apparatus in accordance with the present invention will be apparent from the following detailed discussion together with the accompanying drawings wherein.

DETAILED DESCRIPTION OF THE INVENTION

Figure 1:
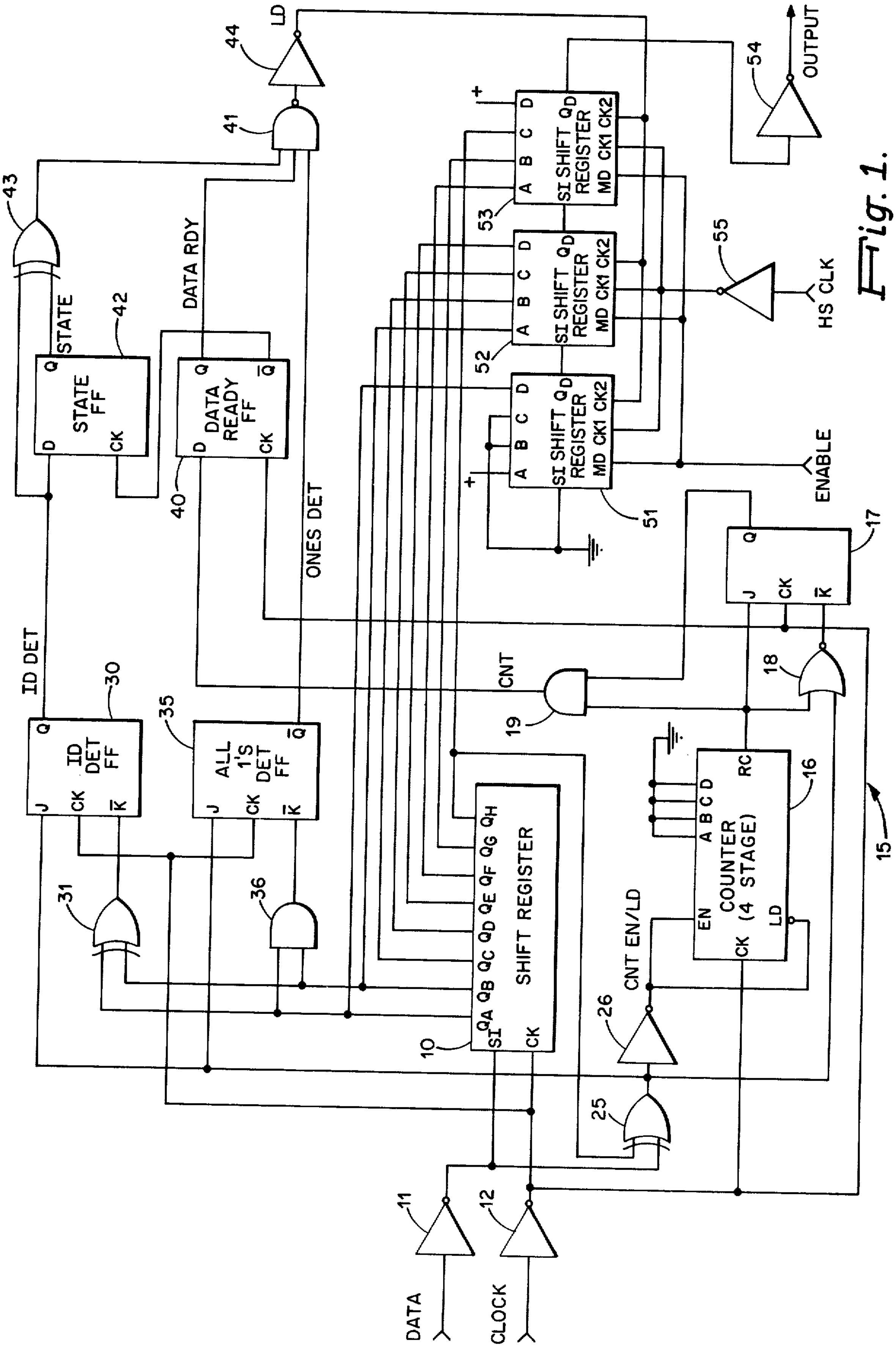
FIG. 1 is a logic diagram of a digital receiver in accordance with the present invention.
Figure 2:
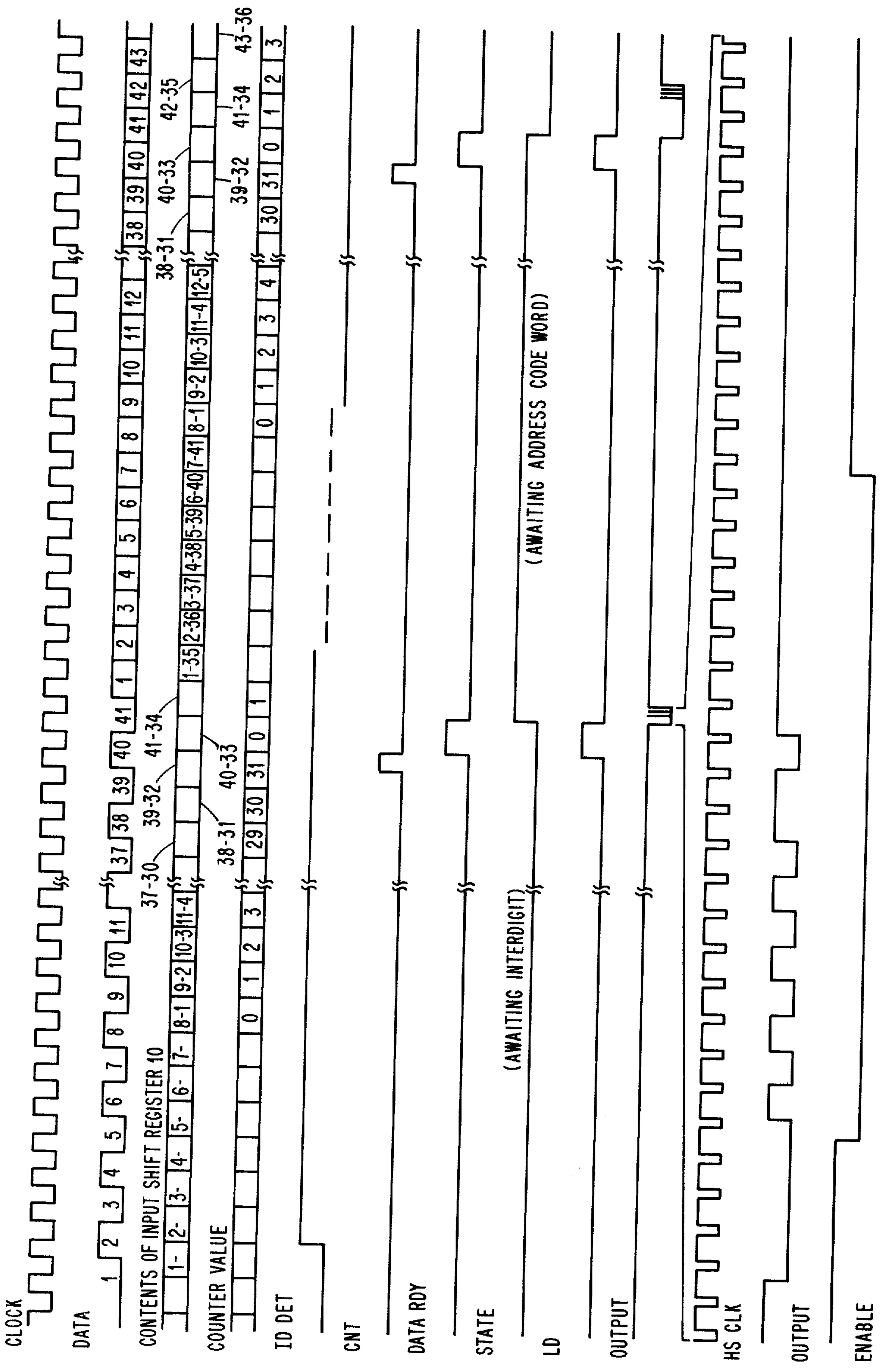
FIG. 2 is a timing diagram illustrating the operation of the digital receiver of FIG. 1.

The digital receiver as illustrated in FIG. 1 is designed to receive digital DATA signals in serial bit format as illustrated in FIG. 2 on the DATA line. The digital bits are received in synchronism with a CLOCK signal on the CLOCK line. The digital words are in an 8-bit permutable code. Prior to receiving an address code word and in the interval between address code words the receiver receives interdigit code words of alternating 1's and 0's (that is, either 10101010 or 01010101).

The receiver must first receive five consecutive identical words of an interdigit code in order to be activated to accept an address code word. Until the receiver is activated it is unable to accept an address code word. In addition, the receiver does not accept an interdigit code word until after receiving and accepting an address code word. After being appropriately activated and then receiving five consecutive identical code words, the receiver produces a signal on the OUTPUT line indicating that an interdigit code word or a valid address code word has been received and accepted. Then, in response to an ENABLE signal on the ENABLE line the receiver transmits the 8-bit code word in serial bit format on the OUTPUT line at a bit rate determined by high speed clock pulses on the HS CLK line. In one specific embodiment the CLOCK pulses and DATA signal bits are received at a 32 KHz rate and the bits of the accepted code words are read out by HS CLK pulses at a 1.152 MHz rate. After accepting and reading out either an interdigit code word or an address code word the receiver is in condition to receive the other code word.

The receiver includes an 8-stage input shift register 10. Incoming DATA signals are applied to the serial input of the shift register through an inverter 11 and the CLOCK signals are applied to the shift register through an inverter 12. The input shift register operates in the usual fashion to shift the bits of data on the falling edge of each CLOCK pulse from one stage to the next as illustrated in FIG. 2.

The receiver includes a count-to-32 counter 15 which is an arrangement of a 4-stage counter 16, a $J\bar{K}$ flip-flop 17, a NOR gate 18, and an AND gate 19 interconnected as shown in FIG. 1. The counter 15 counts CLOCK pulses (synchronized with the DATA bits) which are applied to the clock inputs of the counter 16 and flip-flop 17 through the inverter 12. Counter 16 accepts a count of a clock pulse when the CNT EN/LD signal at the enable input is high. When the CNT EN/LD signal at the load input to counter 16 is low during a CLOCK pulse, the counter loads 0's at its parallel inputs, or, in effect, is cleared. A high CNT signal is produced at the output of the AND gate 19 when the CNT EN/LD signal is high and the accumulated count is 31.

An exclusive-OR gate 25 has its inputs connected to the serial input and to the eighth stage of the input shift register 10. The output of the exclusive-OR gate 25 is applied to the NOR gate 18 of the counter 15 and to an inverter 26. The output of the inverter 26 is the CNT CN/LD signal applied to the enable and load inputs of counter 16. The exclusive-OR gate 25 detects whether or not each incoming bit of DATA is the same as the bit in the eighth stage of the input shift register. If the bits are the same indicating that corresponding bits of two consecutive words are the same, the output of the exclusive-OR gate 25 is low and the CNT EN/LD signal is high during a CLOCK pulse enabling the counter 16 to accept a count. If the bits are different during a CLOCK pulse indicating that corresponding bits of two consecutive words are different, the output of the exclusive-OR gate 25 is high and the CNT EN/LD signal is low. The counter 16 is caused to load all 0's and the flipflop 17 is reset so that the counter 15 is cleared to all 0's.

An interdigit detector for determining whether or not the word stored in the input shift register 10 after five consecutive identical words have been received includes an interdigit detector flip-flop 30 of the $J\bar{K}$ type. The output of the exclusive-OR gate 25 is connected to the J input of the flip-flop and the $\bar{K}$ input is the output of an exclusive-OR gate 31 having its inputs connected to the outputs of the first two stages of the input shift register 10. CLOCK signals are applied to the clock input of the flip-flop through the inverter 12. The Q output of the interdigit detector flip-flop 30 (labeled ID DET) is high at the appropriate time after receiving five consecutive identical digital words if the word in the shift register is an interdigit code word and is low if the digital word is other than an interdigit code word.

The interdigit detector flip-flop 30 is triggered to the set condition when the counter 15 is cleared. Whenever the bits in the first two stages of the input shift register 10 are identical (indicating the code word is not an interdigit word) the exclusive-OR gate 31 produces a low signal to the $\bar{K}$ input of the interdigit detector flip-flop 30 triggering it to the reset condition. The operation of this arrangement is such that the interdigit detect signal (ID DET) at the Q output of the interdigit detector flip-flop 30 is high indicating an interdigit code word and low indicating an address code word when the fifth consecutive identical digital word is in the input shift register 10.

An all 1's detector includes an all 1's detector flip-flop 35 of the $J\bar{K}$ type. The J input is connected to the output of the exclusive-OR gate 25 and the $\bar{K}$ input is connected to the output of an AND gate 36 having two inputs connected to the first two stages of the input shift register 10. The all 1's detector flip-flop 35 is clocked by the inverted CLOCK pulses. A ONES DET signal is taken at the $\bar{Q}$ output of the all 1's detector flip-flop 35.

The all 1's detector flip-flop 35 is triggered to the set condition when the counter 15 is cleared in the same manner as the interdigit detector flip-flop 30. The subsequent presence of bits other than 1's in the first two stages of the input shift register 10 causes the output of the AND gate 36 to go low resetting the all 1's detector flip-flop 35 and producing a high ONES DET signal. The arrangement operates such that when the fifth consecutive identical digital word is in the input shift register 10, the ONES DET signal is high if the word is not all 1's and is low only if the word is all 1's. The all 1's code word has special significance and is not to be treated as either an interdigit or an address code word.

A data ready flip-flop 40 which is a D-type flip-flop has its D input connected to receive the CNT signal from the counter 15 and is clocked by the inverted CLOCK signals. A DATA RDY signal is taken from the Q output of the data ready flip-flop 40 and applied as one of the inputs to a NAND gate 41. The $\bar{Q}$ output of the data ready flip-flop 40 is applied as the clock input to a D-type state flip-flop 42. The D input to the state flip-flop 42 is the ID DET signal from the interdigit detector flip-flop 30. The operating condition of the state flip-flop 42 is determined by the signal at the D input when the clock input goes high. If the ID DET signal is high at that time, the flip-flop is set and the STATE signal at the Q output is high. If the ID DET signal is low, the flip-flop is reset and the STATE signal is low.

The ID DET signal and the STATE signal from the Q output of the state flip-flop 42 are applied to an exclusive-OR gate 43. The output of the exclusive-OR gate 43 is one of the inputs to the NAND gate 41. A third input to the NAND gate 41 is the ONES DET signal from the all 1's detector flip-flop 35. The output of the NAND gate 41 is inverted by an inverter 44 to produce an LD signal.

As shown in FIG. 2 the data ready flip-flop 40 normally produces a low DATA RDY signal with the flip-flop in the reset condition. The flip-flop is triggered to the set condition producing a high DATA RDY signal on the falling edge of a CLOCK pulse when a high CNT signal is present from the counter 15. At the same time, the $\bar{Q}$ output of the data ready flip-flop 40 goes low. As explained previously the STATE signal from the state flip-flop 42 depends on the ID DET signal from the interdigit detector flip-flop 30 at the time its clock input goes high. Thus, the state flip-flop can change operating conditions only upon triggering of the data ready flip-flop 40 to the reset condition and consequent termination of the high DATA RDY pulse. The output of the exclusive-OR gate 43 during a DATA RDY pulse thus depends upon the previously established condition of the state flip-flop 42 and the ID DET signal. The exclusive-OR gate 43 produces a high signal to the NAND gate 41 if the ID DET signal is high indicating an interdigit code word in the shift register 10 and the state flip-flop is in the reset condition producing a low STATE signal, or if the ID DET signal is low indicating the code word in the shift register is not an interdigit word and the state flip-flop 42 is in the set condition producing a high STATE signal. When either of these sets of circumstances are present, the state flip-flop 42 will be triggered to the opposite condition when the DATA RDY signal terminates. The combination of the NAND gate 41 and inverter 44, therefore, produces a high level LD pulse during a DATA RDY pulse when the state flip-flop 42 is about to change operating conditions and a high ONES DET signal indicates that the input shift register 10 does not contain all 1's.

An output storage register includes three 4-stage shift registers 51, 52, and 53 connected in series. The parallel inputs to eight of the stages are connected to the outputs of the eight stages of the input shift register 10 as shown in FIG. 1. The input to the first stage of the first shift register 51 and to the fourth stage of the third shift register 53 are connected to a positive voltage source. The inputs to the second and third stages of the first shift register 51 are connected to ground. The serial input to the first shift register 51 is also connected to ground. The output of the last stage of the last shift register 53 is connected through an inverter 54 to the OUTPUT line.

The shift registers 51, 52, and 53 are of the type having a mode input and two clock inputs. When the mode input is high the clock 2 input is enabled so that when the clock 2 input is high and then goes low, the signals at the parallel inputs are loaded into the shift register. When the mode input is low the clock 1 input is enabled so that data is shifted through the stages of the shift register on the positive-going edges of clock pulses applied at the clock 1 input. The ENABLE signal (FIG. 2) is applied to the mode input, the high speed clock signal HS CLK is applied to the clock 1 input through an inverter 55 and the LD signal is applied to the clock 2 input.

The ENABLE signal is normally high and thus on the falling edge of the LD pulse the stages of the shift registers 51, 52, and 53 are loaded with the four preset signals and with the eight bits of the digital code word in the input shift register 10. By virtue of the high input to the fourth stage of the last shift register 53, a low signal is produced on the OUTPUT line. This low signal is an indication to other elements of the system that a code word has been accepted by the receiver and placed in the output shift register. In response to this indication a low ENABLE signal is produced and applied to the mode inputs of the shift registers 51, 52, and 53. The inverted HS CLK pulses at the clock inputs cause data in the shift registers 51, 52, and 53 to be read out serially on the OUTPUT line as indicated in FIG. 2. After the eight bits of the digital code word have been read out a 3-bit code (1, 1, 0) is also produced at the OUTPUT. Since the serial input of the first shift register 51 is grounded, upon completion of the readout of the shift registers the register stages are all loaded with 0's, and the OUTPUT signal remains high.

Operation of the digital receiver of FIG. 1 may best be understood by reference to the timing diagram of FIG. 2 which illustrates a specific DATA sequence of 41 bits of an interdigit signal followed by an address code word which is repeated without error for a total of five consecutive words. The DATA bits are applied on the DATA line through inverter 11 to the serial input of the input shift register 10. Each bit is entered into the register and shifted along the stages of the register on the falling edge of each CLOCK pulse as indicated in FIG. 2. After the eighth bit has been received the counter 15 which is receiving a high CNT EN/LD signal during the presence of each CLOCK pulse starts counting upward from zero. Prior to the eighth bit the count in the counter is indeterminate and of no consequence.

Assuming no errors in the interdigit signal, with the $40^{th}$ bit present on the DATA line and with the count in the counter 15 at 31 a CNT pulse is produced by the counter during the CLOCK pulse. During the first word of the interdigit signal the interdigit detector flip-flop 30 and the all 1's detector flip-flop 35 are triggered to the set condition. Since the bits of the first two stages of the input shift register 10 alternate between 1 and 0, the interdigit detector flip-flop 30 is never reset and continues to produce a high ID DET signal as illustrated in FIG. 2. The $\overline{K}$ input to the all 1's detector flip-flop 35 continually receives a reset signal from the first two stages of the input shift register 10 holding the ONES DET signal high after the counter 15 starts accumulating a count.

As illustrated in FIG. 2 the CNT pulse from the counter 15 occurs when the counter indicates a count of 31. However, the counter does not produce a CNT pulse during this period of time unless the CNT EN/LD signal is high indicating that the $40^{th}$ bit being received at the serial input to the shift register 10 is the same as the bit stored in the final stage and, therefore, that five consecutive identical 8-bit words have been received.

The CNT pulse is applied to the data ready flip-flop 40 and on the falling edge of the CLOCK pulse the data ready flip-flop 40 is triggered from the reset to the set condition producing a high DATA RDY signal. At the same time the $40^{th}$ DATA bit is loaded into the first stage of the input shift register 10. It is assumed that the state flip-flop 42 is in the reset condition with the STATE signal low awaiting an interdigit signal as indicated in FIG. 2. Thus, with the combination of a high ID DET signal and a low STATE signal the output of the exclusive-OR gate 43 becomes high. The combination of the high DATA RDY signal from the data ready flip-flop 40, the high ONES DET signal from the all 1's detector flip-flop 35, and the high signal from the exclusive-OR gate 43 causes the NAND gate 41 and the inverter 44 to produce a high LD signal. The manner in which the code word in the input shift register 10 is loaded into the output shift registers 51, 52, and 53 on the falling edge of the LD signal will be explained in detail hereinbelow.

On the falling edge of the next CLOCK pulse since the CNT signal has returned to low the data ready flip-flop 40 is triggered to the reset condition and the DATA RDY pulse terminates thereby terminating the LD pulse. The $\overline{Q}$ output of the data ready flip-flop 40 goes high and since the D input to the state flip-flop (the ID DET signal) is high, the state flip-flop is triggered to the set condition and the STATE signal becomes high. Thus, after receipt of five consecutive identical 8-bit interdigit words the state flip-flop 42 is left in the set condition. By virtue of this situation if the next five consecutive words are also the interdigit signal, the exclusive-OR gate 43 output remains low and no LD signal will be produced. By placing of the state flip-flop 42 in the set condition the receiver has been activated to receive and accept an address code word and to not accept another interdigit code word.

As indicated previously the code word in the input shift register 10 is loaded into the output shift registers 51, 52, and 53 by the LD pulse. Since the ENABLE signal to the mode input of the output shift registers 51, 52, and 53 is normally high, the clock 2 inputs are enabled. When the high LD signal goes low the data at the parallel inputs is loaded into the stages of the output shift registers. DATA bits 33 through 40 are loaded into the third stage of the third shift register 53 to the fourth stage of the first shift register 51. The first three stages of the first shift register 51 and the fourth stage of the third shift register 53 are loaded with a 1, 0, 0, and 1, respectively. Loading of a 1 in the last stage of the last shift register 53 produces a low OUTPUT signal.

When the ENABLE signal at the mode inputs of the output shift registers 51, 52, and 53 goes low, the clock 1 inputs are enabled. The inverted HS CLK signal which is continually applied to the clock 1 inputs shifts the data through the shift registers to the OUTPUT. As the data is shifted out it is replaced by 0's and after all the data is shifted out the OUTPUT goes high. Upon termination of the ENABLE signal the OUTPUT remains high.

For purposes of illustration the timing diagram of FIG. 2 shows the apparatus as receiving a few more bits of interdigit signal and then receiving an address code signal. The input shift register 10 and the counter 15 operate as explained previously receiving the address code bits and counting the number of bits stored starting with a count of 1 on the ninth bit. Any count in the counter previous to the ninth bit is indeterminate and of no effect. Also before the counter 15 starts to accumulate a count on the ninth bit the interdigit detector flip-flop 30 and the all 1's detector flip-flop 35 are set and these flip-flops will produce ID DET or ONES DET signals incorrectly indicating an interdigit signal and an all 1's signal, respectively. However, these signals have no effect on the receiver and both flip-flops subsequently are reset so that at the time of the DATA RDY pulse both the ID DET and the ONES DET signals provide proper indications as to the presence or absence of an interdigit signal or an all 1's word.

The CNT pulse is produced by the counter 15 at the count of 31 as the $40^{th}$ bit of the address code signal is being applied at the input to the input shift register 10. Upon termination of the CNT pulse the data ready flip-flop 40 is triggered to the set condition producing a high DATA RDY signal to the NAND gate 41. Since the state flip-flop 42 was previously triggered to the set condition, the STATE signal is high. The ID DET signal is low and, therefore, the output of the exclusive-OR gate 43 is high. The ONES DET signal is also high. Since the inputs to the NAND gate 41 are all high, the LD signal goes high. Thus, as explained previously the digital word stored in the input shift register 10 is loaded into the stages of the output shift registers 51, 52, and 53. This word together with the preset bits are transferred to the OUTPUT line in serial fashion by the inverted HS CLK pulses during a low ENABLE signal.

Upon termination of the DATA RDY pulse on the falling edge of the next CLOCK pulse, the $\overline{Q}$ output from the DATA RDY flip-flop 40 goes high. Since the ID DET signal at the D input of the state flip-flop 42 is low, that flip-flop is triggered to the reset condition and the STATE signal goes low. In this condition as explained previously the receiver is in condition to receive and accept an interdigit signal. It is not in condition to accept another address code word until it is activated by first receiving five consecutive identical interdigit code words to change the state flip-flop 42 to the set condition.

While there has been shown and described what is considered a preferred embodiment of the present invention, it will be obvious to those skilled in the art that various changes and modifications may be made therein without departing from the invention as defined in the appended claims.

What is claimed is:

1. Digital receiving apparatus comprising input storage means for receiving and storing digital words;

detection means for detecting the presence or absence of particular digital code words stored in said input storage means;

counting means for determining when said input storage means has received a predetermined number of identical digital words in succession;

control means coupled to said detection means and to said counting means and having two operating states; said control means being operable in a first operating state in response to a determination that said predetermined number of identical particular digital code words have been received by said input storage means; and being operable in the second operating state in response to a determination that said predetermined number of identical digital words other than said particular digital code words have been received by said input storage means; said control means being operable to produce an indication in response to a determination that said predetermined number of identical particular digital code words have been received by said input storage means when in said second operating state, and being operable to produce an indication in response to a determination that said predetermined number of identical digital words other than said particular digital code words have been received by said input storage means when in said first operating state;

output storage means coupled to said input storage means and to said control means for receiving and storing a digital word stored in said input storage means in response to an indication from said control means; and readout means for applying a readout signal to said output storage means to read out the digital word stored in said output storage means.

2. Digital receiving apparatus in accordance with claim 1 wherein said detection means is operable to produce a first output signal during the presence of said particular digital code words stored in said input storage means and is operable to produce a second output signal during the presence of a digital word other than said particular digital code words stored in said input storage means;

said counting means is operable to produce an output signal in response to determining that said input storage means has received said predetermined number of identical digital words in succession; and said control means is caused to operate in said first operating state in response to receiving an output signal from said counting means while receiving a first output signal from said detection means and is caused to operate in said second operating state in response to receiving an output signal from said counting means while receiving a second output signal from said detection means.

3. Digital receiving apparatus in accordance with claim 2 wherein said control means includes bistable means coupled to said detection means and having first and second operating conditions; said bistable means being caused to operate in the first operating condition in response to termination of a control pulse applied thereto while receiving said first output signal from said detection means and being caused to operate in the second operating condition in response to termination of a control pulse applied thereto while receiving said second output signal from said detection means; said bistable means producing a first output signal when in said first operating condition and producing a second output signal when in said second operating condition;

control input means coupled to said bistable means and to said counting means; said control input means being operable to produce a control pulse to said bistable means in response to receiving an output signal from said counting means; and control output means coupled to said control input means, said bistable means, and said detection means; said control output means being operable to produce said indication in response to a first output signal from said detection means while said bistable means is producing said second output signal and while said control input means is producing a control pulse, and being operable to produce said indication in response to a second output signal from said detection means while said bistable means is producing said first output signal and while said control input means is producing a control pulse.

4. Digital receiving apparatus in accordance with claim 3 wherein each digital word consists of N bits;

said input storage means includes shift register means having N stages;

said counting means includes count accumulating means operable to record a count for each bit received by said shift register means and to produce an output signal when the accumulated count reaches a preset value indicating said predetermined number of digital words have been received; and count clearing means coupled to the input to said shift register means, to the last of said N stages of the shift register means, and to said count accumulating means; said count clearing means being operable to clear said count accumulating means of the accumulated count when the bit being applied to the input is different from the bit in the last stage indicating that two digital words in succession are not identical.

5. Digital receiving apparatus in accordance with claim 4 wherein said control input means includes a second bistable means coupled to said counting means;

said second bistable means having first and second operating conditions and producing said control pulse while in the first operating condition; said second bistable means being triggered from the second to the first operating condition in response to an indication from the counting means and being triggered from the first to the second operating condition thereby terminating a control pulse being produced.

6. Digital receiving apparatus in accordance with claim 5 wherein the bits of the said digital words are received in series;

and including means for applying a clock pulse to said second bistable means in synchronism with each bit received by said input storage means; and said second bistable means being triggered from the second to the first operating condition by a clock pulse applied thereto while receiving an output signal from the counting means, and being triggered from the first to the second operating condition by the next clock pulse.

* * * * *